United States Patent [19]

Cripe

[11] 4,387,933
[45] Jun. 14, 1983

[54] RELAY-LOAD/RATIO VALVE FOR USE IN BRAKE APPLICATIONS ON AIR-SPRING EQUIPPED VEHICLES

[75] Inventor: Christopher A. Cripe, Coatesville, Pa.

[73] Assignee: The Bi-Modal Corporation, Greenwich, Conn.

[21] Appl. No.: 308,378

[22] Filed: Oct. 5, 1981

[51] Int. Cl.³ .............................................. B60T 8/18
[52] U.S. Cl. .................... 303/22 A; 188/195; 303/23 A; 303/40; 105/215 C
[58] Field of Search ............... 303/22 A, 23 A, 22 R, 303/23 R, 6 M, 6 C, 6 R, 28–30, 40, 57–59; 188/349, 195; 137/627.5; 105/215 C

[56] References Cited

U.S. PATENT DOCUMENTS

| | | | |
|---|---|---|---|
| 3,606,485 | 9/1971 | Scott | 303/22 R X |
| 3,671,087 | 6/1972 | Pekrul | 303/22 R X |
| 3,936,097 | 2/1976 | Yanagawa et al. | 303/22 R |
| 3,944,294 | 3/1976 | Masuda et al. | 303/22 R X |
| 4,202,277 | 5/1980 | Browne et al. | 105/215 C |

Primary Examiner—Douglas C. Butler
Attorney, Agent, or Firm—Max R. Millman

[57] ABSTRACT

A control valve is provided for use in brake applications in air-spring equipped railroad and highway vehicles, particularly convertible rail-highway semi-trailers. Such vehicles usually employ pneumatic brake cylinders. The control valve combines the functions of a relay valve with two distinct output limiting characteristics, namely, service and emergency, which output limiting characteristics depend upon vehicle weight is indicated by air spring pressure. The control valve also produces an automatic minimum output to prevent total loss of braking should air spring pressure be lost due to failure.

12 Claims, 7 Drawing Figures

RAILROAD APPLICATION FOR CARS WITH SUPPLY PIPE

RAILROAD APPLICATION FOR CARS WITHOUT SUPPLY PIPE

HIGHWAY APPLICATION
AIRSPRING-EQUIPPED SEMI-TRAILER

HIGHWAY TRACTOR: FRONT AXLE LOAD-RATIO
SYSTEM FOR AIRSPRING EQUIPPED TRACTORS

RELAY-LOAD/RATIO VALVE FOR USE IN BRAKE APPLICATIONS ON AIR-SPRING EQUIPPED VEHICLES

This invention relates to a control valve for use with air spring equipped vehicles such as the convertible rail-highway semi-trailer disclosed in U.S. Pat. No. 4,202,277.

A common problem with such vehicles is that, because they operate over a wide range of empty to loaded weights, sufficient braking force for the fully laden vehicle produces excessive braking when empty and proper braking forces for the empty vehicle is insufficient for the laden vehicle.

The primary object of this invention is to provide a control valve which will overcome the aforementioned problem by producing a uniform braking force regardless of the loading of the vehicle.

Another object of the invention is to provide a control valve of the character described for use with pneumatic brake cylinders which combines the functions of a relay valve with two distinct output limiting characteristics necessary for railroad application, namely, service and emergency, the output limiting characteristics being dependent upon vehicle weight as indicated by air spring pressure.

Another object of the invention is to provide a relay-load/ratio control valve especially suitable for railroad brake applications. Conventionally, in railroad applications, the emergency output is always higher than the service output for a given air spring pressure. Railroad cars employ a brake pipe normally pressurized, the pressure in which drops to atmosphere during emergency brake applications. The present control valve functions to produce service or emergency output characteristic in response to a third input from the brake pipe, the valve responding to switch over from the service output characteristic to the emergency output characteristic when the brake pipe pressure drops to atmosphere.

Another object of the invention is to provide a control valve of the character described which produces an automatic minimum output upon demand, should air spring pressure be lost due to a failure, thereby preventing total loss of braking on the vehicle due to this failure.

These and other objects and features of the invention will become more apparent as the following description proceeds in conjunction with the accompanying drawings, wherein.

Specific reference will now be made to the drawings in which similar reference characters are used for corresponding elements throughout.

Figure 1:
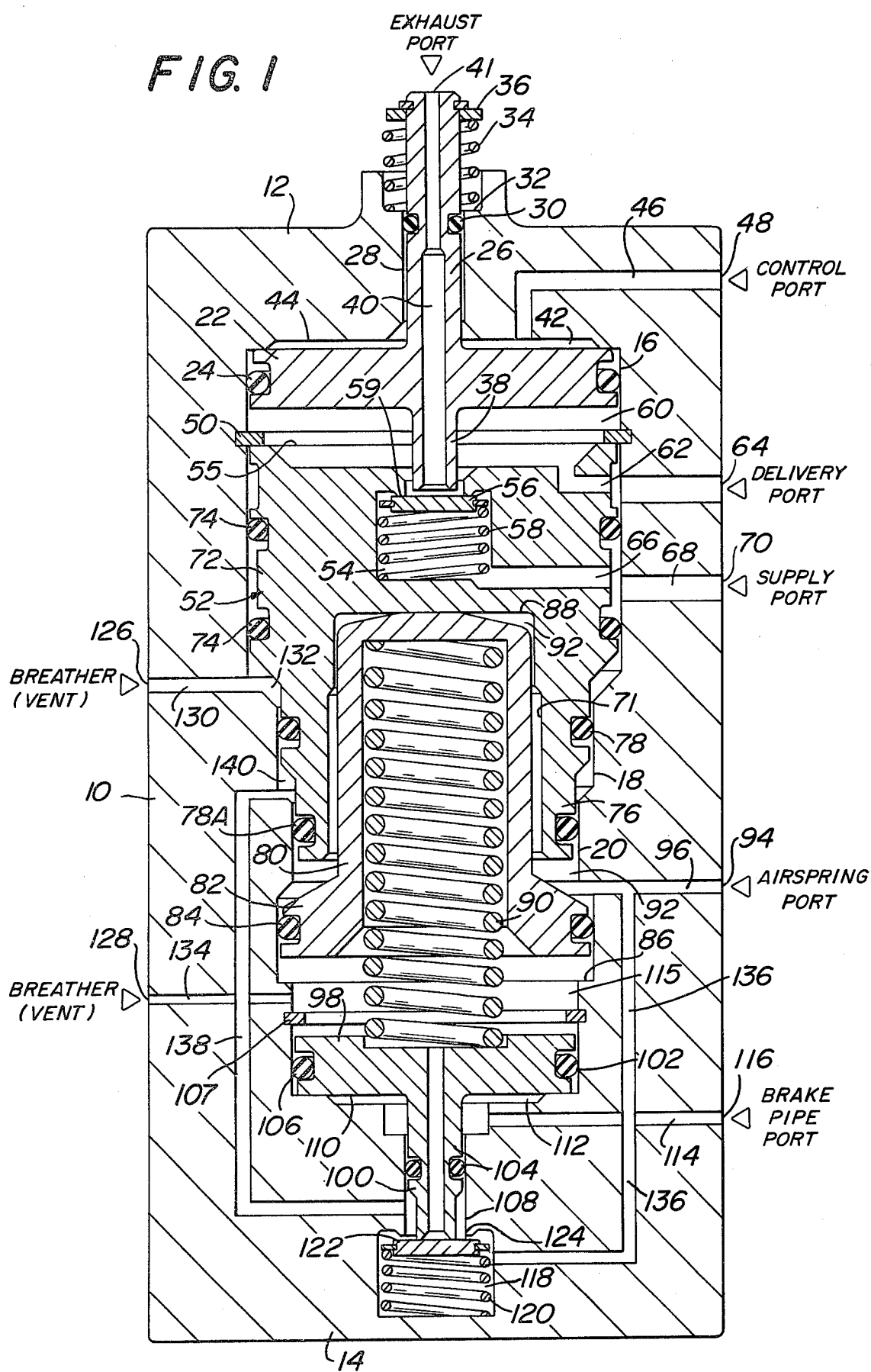
FIG. 1 is an enlarged vertical sectional view through the instant valve in railroad application when no air pressure is applied thereto, i.e. brakes are released.
Figure 2:
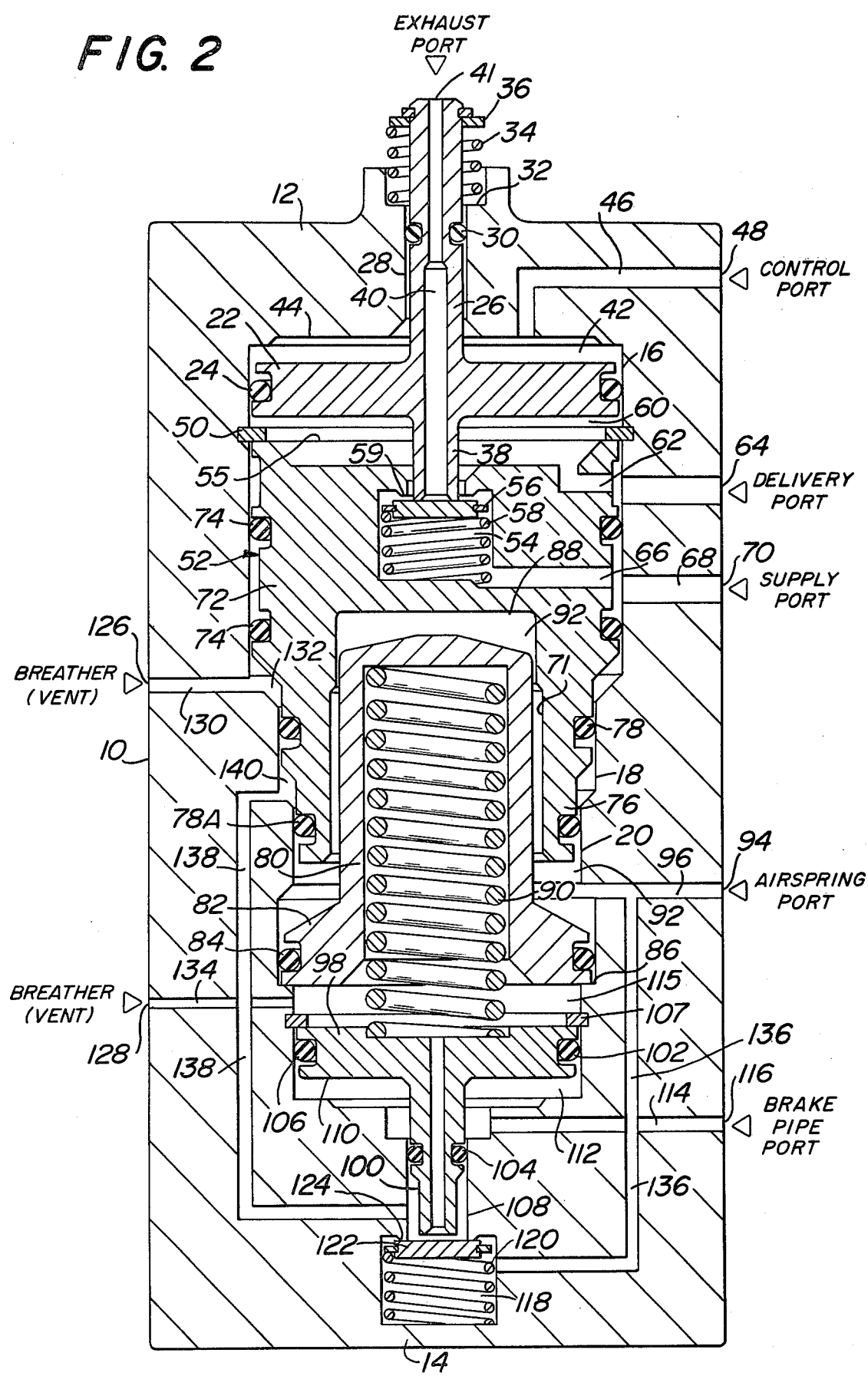
FIG. 2 is a view similar to FIG. 1 showing the instant valve in railroad application when the service brake is applied in a fully loaded vehicle.
Figure 3:
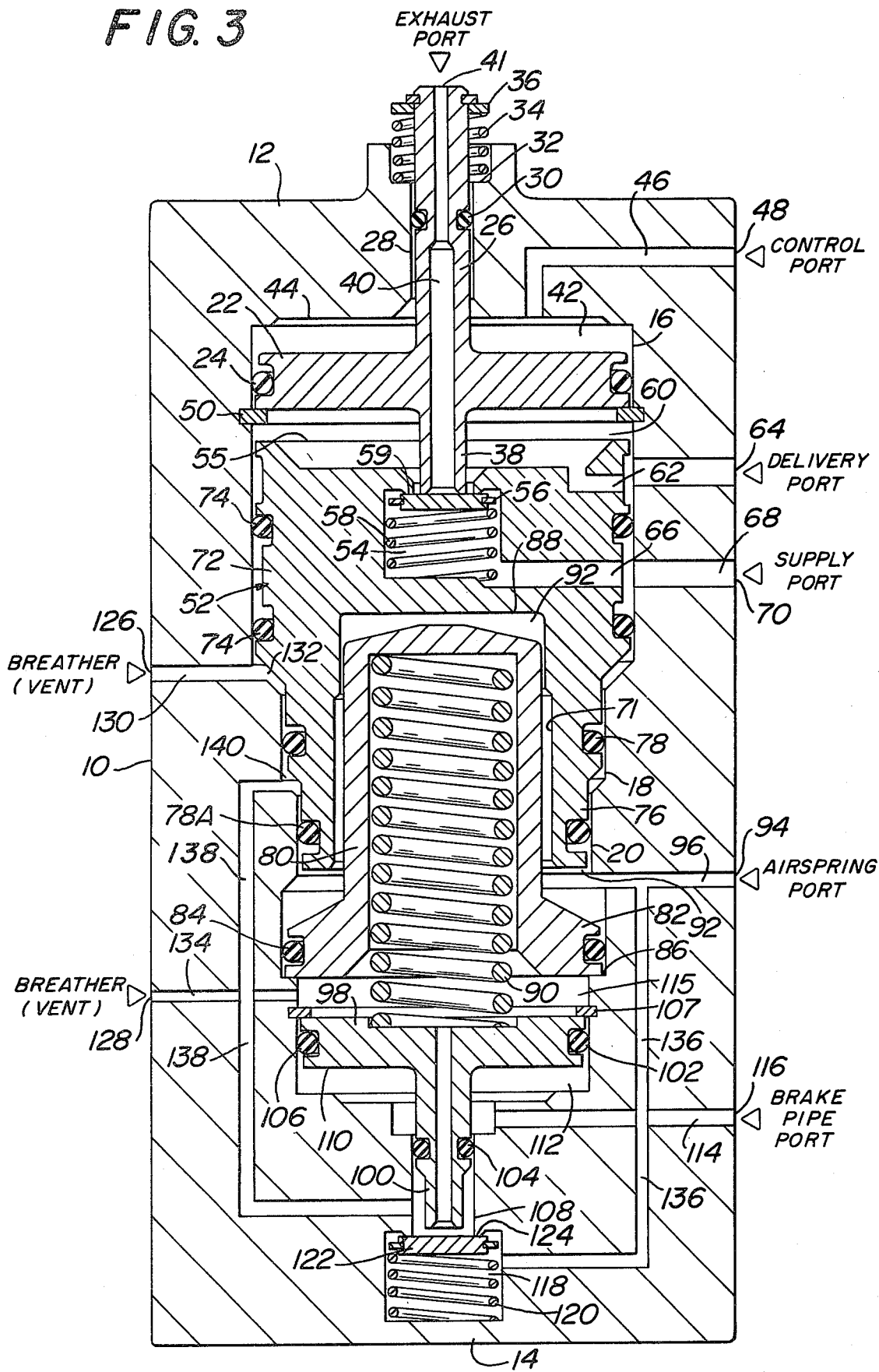
FIG. 3 is a view similar to FIG. 2 showing the instant valve in railroad application in service brake application on a lightly loaded vehicle.

Referring first to FIGS. 1-3, the valve comprises a main body portion or casing 10 of any desired shape. Although not so shown, it will be understood that the upper and lower portions 12 and 14 will be in the form of caps bolted to the main body portion to permit assembly of the inner members. The casing is hollow and contains concentric cylindrical intercommunicating step bores, the upper bore 16 being of greater diameter than the intermediate bore 18 and of somewhat greater diameter than the lower bore 20.

Slidable in the bore 16 is a relay piston 22 equipped with an O-ring 24 to form an air pressure seal. The relay piston is integral with a hollow stem 26 which extends slidably and upwardly of the piston through a bore 28 in the cap 12 and is also equipped with an O-ring pressure seal 30. The cap at the bore 28 includes a shoulder 32 serving as a seat for a spring 34 interposed between the shoulder and a stop member or seat 36 on the stem, the spring acting to urge the stem and relay piston 22 upwardly. Integral with the relay piston 22 and extending downwardly therefrom is stem portion 38 which, in effect, is an extension of the stem 26. The hollow passage 40 in the stem extends axially through both stem portions 26 and 38 and terminates in an exhaust port 41, it being understood that there will be an exhaust protector, not shown, attached to the cap 12 to prevent entrance of dirt.

The space 42 between the upper surface of the relay piston 22 and the upper surface 44 of the bore 16 is a chamber which communicates through passages 46 with control port 48 equipped with a suitable pipe fitting (not shown). Beneath the relay piston 22 and secured to the casing is an inwardly extending snap ring 50 serving as a stop.

A load limiting piston 52 is provided having a central axial chamber 54 opening through its upper surface 55 in which is positioned check valve 56 normally urged upwardly into engagement with a seat 59 by a spring 58. The space between the upper surface 55 of the load limiting piston and the lower surface of the relay piston 22 is a chamber 60 which communicates by radial passages 62 through the load-limiting piston to the casing to delivery port 64 also equipped with pipe fittings. Extending radially from the recess or chamber 54 in the piston 52 are passages 66 which communicate with another radial passage 68 in casing 10 that terminates in supply port 70 also equipped with pipe fittings.

The load-limiting piston 52 includes an axially extending hollow center 71 thereby providing an upper piston portion 72 slidable in the bore 16 and equipped with O-ring seals 74 and a lower portion 76 slidable in the intermediate and lower bores 18 and 20 and also equipped with O-ring air seals 78 and 78A.

Slidable in the hollow center 71 is a hat-shaped bias piston 80, the lower portion 82 being enlarged and equipped with an air seal O-ring 84 and engageable with a step ledge 86 serving as a stop limiting downward movement of the bias piston 80, the same being normally urged upwardly away from the stop 86 and towards the top surface 88 of the hollow center 71 by an internal spring 90, as shown in FIG. 1. The space above the bias piston 80 and below the lower portion 76 of the load-limiting piston 52, which are in communication with each other, is a chamber 92 sealed off by the O-rings 84 and 78A. The air spring port 94 extending through the casing (and including a pipe fitting) communicates with the chamber 92 vias a passage 96.

An emergency compensation piston 98 is provided having a downwardly extending hollow valve stem 100. The internal biasing spring 90 is interposed between the top undersurface of the bias piston 80 and the piston 98. The piston 98 is equipped with an air seal O-ring 102 and the valve stem 100 is also equipped with an O-ring air seal 104. The piston 98 is slidable in a lower bore 106 and is limited in its upward movement by a snap ring stop 107 whereas the hollow valve stem 100 is slidable in a still narrower bore 108. The space between the lower surface 110 of the piston 98 and the O-ring 104 is a sealed chamber 112 which communicates via a passage 114 with a brake pipe port 116 in the casing (and including a pipe fitting). The space between the upper surface of the piston 98 and the lower portion 82 of the piston 80 is a chamber 115.

A recess or chamber 118 is provided in the lower or cap portion 14 of the casing 10 in which is contained a spring 120 biased a check valve 122 against an annular seat 124 at the top of the chamber 118.

Two breather vents 126 and 128 are provided in the casing equipped with breather fittings (not shown). Breather vent 126 is connected by a passage 130 to an area 132 at the level juncture between the upper portion 72 of the piston 52 and its lower portion 76. The breather vent 128 communicates by passage 134 with the chamber 115. The casing is also provided with a passage 136 interconnecting the air spring port passage 96 with the check valve chamber 118. The area above the lower check valve 122 communicates by passage 138 with a compensation chamber 140 annularly around the lower portion 76 of the piston 52.

The operation of the control valve will now be described in connection with the various functions it is designed to perform. For brake release, as shown in FIG. 1, with no control or input pressure at control port 48, the relay valve piston 22 and it stems 26 and 38 are pulled upward by return spring 34. This allows any air present at the delivery port 64 and chamber 60 to escape through passage 40 in the hollow stem 26 via exhaust 41 to atmosphere. This releases any pressure in the brake cylinders (BC).

For service brake application in a fully loaded vehicle, as shown in FIG. 2, brake pipe air enters the valve via brake pipe port 116 and passage 114 and into chamber 112 beneath the emergency compensation piston 98, causing the piston to move upwardly against the force of spring 90. The piston 90 rises only to stop 107 allowing air which may be present in compensation chamber 140 to escape to atmosphere via passages 138 and hollow valve stem 100 and vent passage 134 through breather vent 128.

Air spring pressure enters the valve through air spring port 94 and into chamber 92 under the lower portion 76 of load-limiting piston 52. Air spring pressure also passes to chamber 118 via passage 136 where it stops, during service applications, as check valve 124 is seated at this time due to the position of the valve stem 100 and piston 98. Pressure in chamber 92 also exerts a downward force on the minimum application piston 80. This overcomes the force of the minimum application spring 90 and moves piston 80 downward out of communication with load-limiting piston 52.

Supply pressure enters the valve through supply port 70 and via passages 66 and 68 and into chamber 54. At this time, check valve 56 is closed, that is, against seat 59, whereby supply air stops at chamber 54 until a brake application is made.

When a brake application is made, control pressure enters the valve through control port 48 and passages 46 and fills chamber 42 on the top of relay piston 22. This overcomes the force of return spring 34 and moves the relay piston 22 and its stem 38 downward. The stem first contacts the check valve 56 closing off passage 40 to exhaust. Further downward movement of the stem unseats the check valve 56, allowing supply air in chamber 54 to enter chamber 60 under the relay piston 22 and out passages 62 to the delivery port 64, and to the vehicle brake cylinders (BC). For a given control input pressure, delivery pressure in chamber 60 will balance the control in chamber 42 on each side of the relay piston 22. At this equilibrium point, check valve 56 will reseat with exhaust passage 40 still seated. Thus, all flow of air stops within the valve and a lap position is achieved. Increasing or decreasing the control pressure in chamber 42 above relay piston 22 will unbalance the equilibrium and move the relay piston 22 downward or upward respectively, causing delivery pressure to either be increased or exhausted. Under these conditions, i.e., high air spring pressure in chamber 42 beneath load-limiting piston 52, the load-limiting piston 52 remains fully upward against its stop 50, and the valve will deliver the same pressure as is supplied to control port 48. Thus, full brake cylinder pressure is available for a fully loaded vehicle.

FIG. 3 illustrates the valve in service brake application in an empty or lightly loaded vehicle. The conditions are the same as those described hereinabove with reference to FIG. 2 except that air spring pressure in chamber 92 beneath the load-limiting piston 52 is lower, thus the upward force on piston 52 is proportionally lower. If control pressure in chamber 42 causes delivery pressure in chamber 60 to exceed the proper level for a particular air spring pressure, pressure in chamber 60 exerts a force downward on load-limiting piston 52 exceeding the force upward exerted by air spring pressure in chamber 92. The load-limiting piston 52 will then move downward away from relay piston 22 and its stem 38. This will close the check valve 56 and prevent the valve from responding to any further increase in control pressure. In extreme cases, relay piston 22 will move fully downward against the stop 50 and load-limiting piston 52 will move downward a like amount to limit the output pressure in chamber 60. Under these conditions, there is a deliberate imbalance of pressures in chamber 42 above the relay piston 22 and in chamber 60 below the relay piston. The point at which limiting takes place is solely determined by the ratios of piston areas on the top of load-limiting piston 52 and the bottom of that piston. If air spring pressure in chamber 92 is low, a low pressure in chamber 60 will move load-limiting piston 52 downward to limit the valve output. As air spring pressure in chamber 92 increases, a proportionally greater pressure is required in chamber 60 to move the piston 52 downward before output limiting occurs. Thus, the heavier the vehicle (with corresponding greater air spring pressure), the higher output or delivery pressure can be passed to the vehicle brake cylinders in response to control pressure.

For service brake application when there is failure of the air springs, the operation is the same as that set forth hereinbefore with reference to FIG. 3 except that no air spring pressure is present in chamber 92, in which case bias piston 80 will move upward by the force of spring 90, and bias piston 80 will then push upward on load-limiting piston 52. The force of spring 90 is such as to provide the equivalent upward force as would be produced by air spring pressure of an empty vehicle if it were present in chamber 92. Thus, with a failed air spring, the valve will pass an output pressure similar to that of an empty vehicle condition.

For emergency brake application, the instant valve operates in a similar manner to that described above with reference to FIGS. 2 and 3 depending on the vehicle load, except for the following. During emergency brake applications, brake pipe pressure in passage 114 and chamber 112 drops to zero. When this occurs, the force of spring 90 will move compensation piston 98 and its hollow valve stem 100 downward to close off the exhaust passage through the hollow stem 100 and unseat the check valve 122, allowing the air spring pressure in chamber 118 to flow through passage 138 to compensation chamber 140. Air spring pressure then acts upon both chamber 92 and chamber 140 to produce an upward force on the load-limiting piston 52. In effect, the air spring piston area is increased, thus producing a larger upward force on the load-limiting piston 52. Under this condition, a higher delivery pressure than normal is required in chamber 60 in order to move load-limiting piston 52 downward to limit the output pressure. Thus, the valve will allow a higher output pressure to be passed in response to control pressure through control port 48 during an emergency brake application. The difference between service and emergency limiting points is determined by the ratios of the effective piston areas of the load-limiting piston 52 in the chambers involved.

The different installations of the instant relay-load-/ratio valve in various vehicles are illustrated in FIGS. 4-7.

Figure 4:
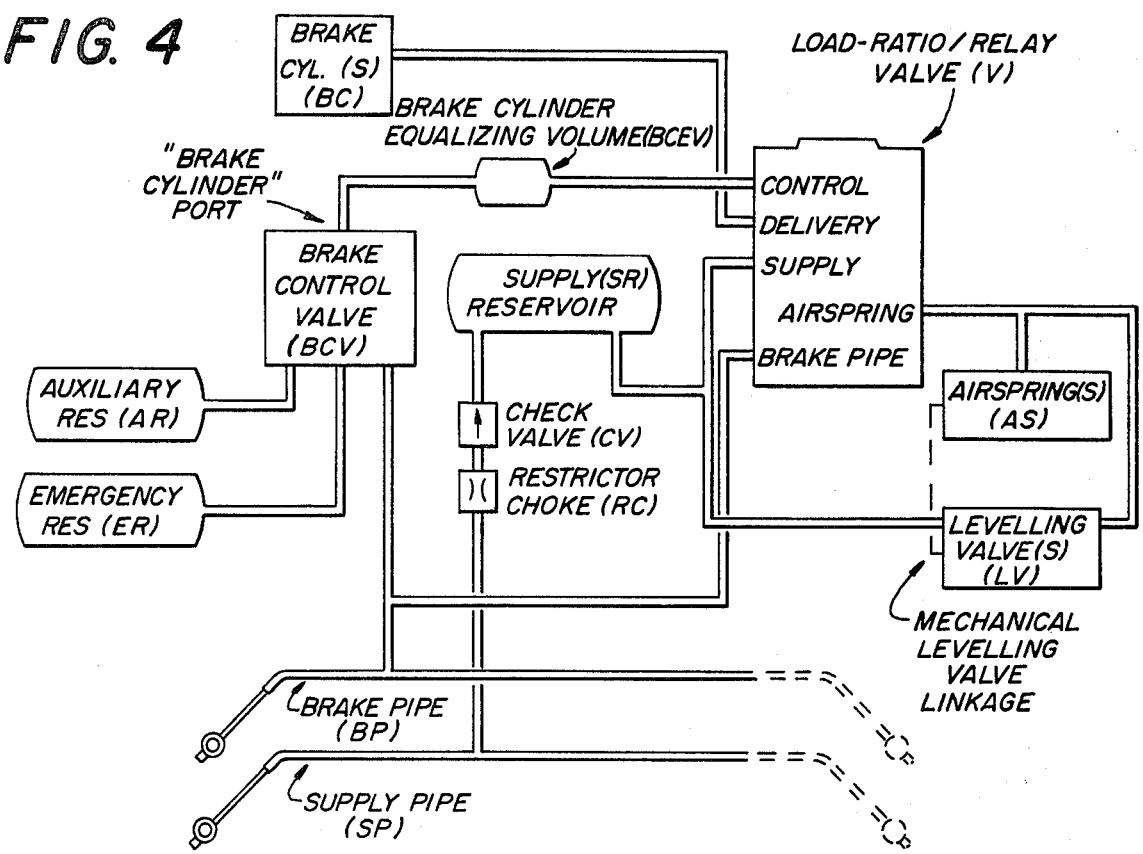
FIG. 4 is a diagrammatic view showing the railroad application of the instant control valve for car equipped with a supply pipe separate from the brake pipe.

In FIG. 4, which shows a railroad installation whose cars are equipped with a supply pipe (SP), the latter is connected to a supply reservoir (SR) via a restrictor choke (RC) and a check valve (CV). The supply reservoir connects to the supply port 70 of the instant load-ratio/relay valve (V) and to the levelling valves (LV) which are, in turn, connected to the rail wheel air springs (AS), the air springs being connected to the instant valve (V) at the air spring port 94. The brake pipe (BP) connects to the instant valve (V) at the brake pipe port 116 and to a brake control valve (BCV) which communicates with auxiliary and emergency reservoirs (AR) and (ER), respectively. Through the brake cylinder port, the brake control valve connects to the control port 48 of the instant valve, there being a brake cylinder equalizing volume device (BCEV) in the connecting line. Brake cylinders (BC) connect to the instant valve (V) at the delivery port 64.

Figure 5:
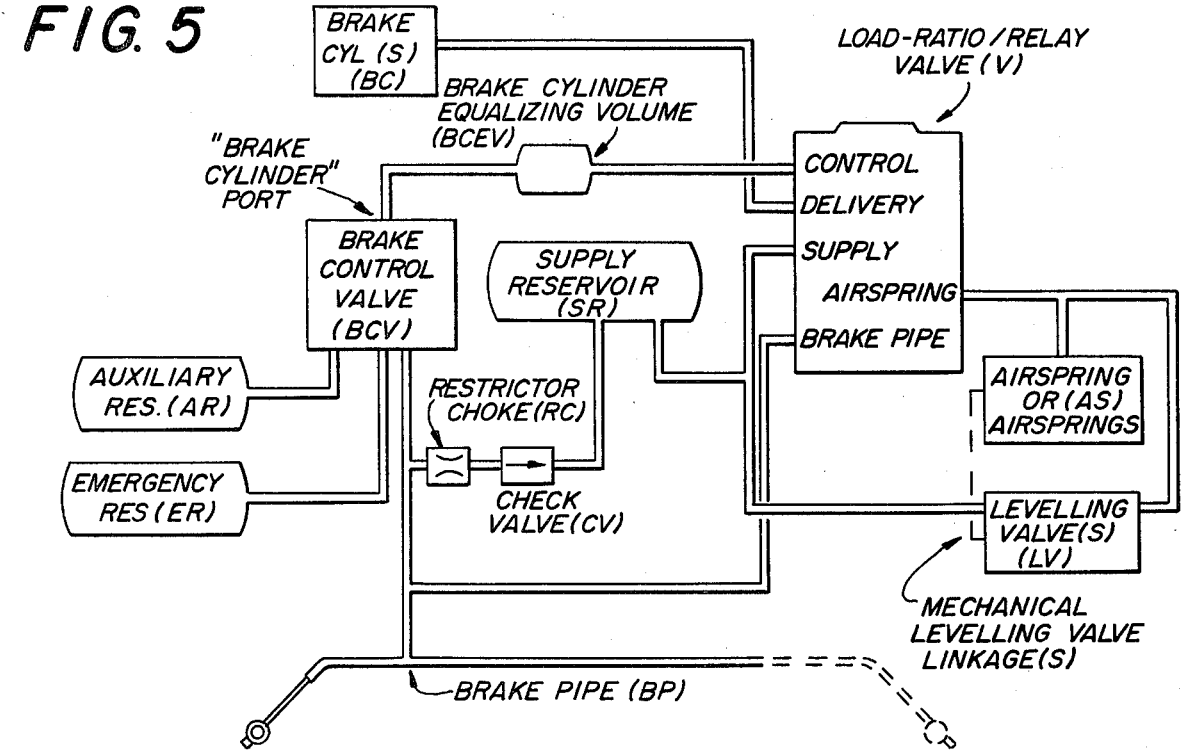
FIG. 5 is a view similar to FIG. 4 for rail cars without a supply pipe.

In FIG. 5 which also illustrates a railroad installation but whose cars do not contain a supply pipe, the brake pipe (BP), as described hereinbefore, connects to the instant valve (V) at the brake port 116. It also connects to a conventional brake control valve (BCV) which communicates with an auxiliary reservoir (AR) and an emergency reservoir (ER), the brake control valve (BCV) connecting through its brake cylinder port to the instant valve (V) at the control port 48 utilizing an intermediate brake cylinder equalizing volume device (BCEV). The brake cylinders (BC) connect to the instant valve (V) at the delivery port 64. Without a supply pipe, the line (L) from the brake pipe to the brake control valve branches and via a restrictor choke (RC) and check valve (CV) connects to a supply reservoir (SR). The supply reservoir connects, as previously described, via one branch to the instant valve (V) at the supply port 70 and via another branch to the levelling valves (LV) which connect to the air springs (AS) which, in turn, connect to the instant valve (V) at the air spring port 94.

Figure 6:
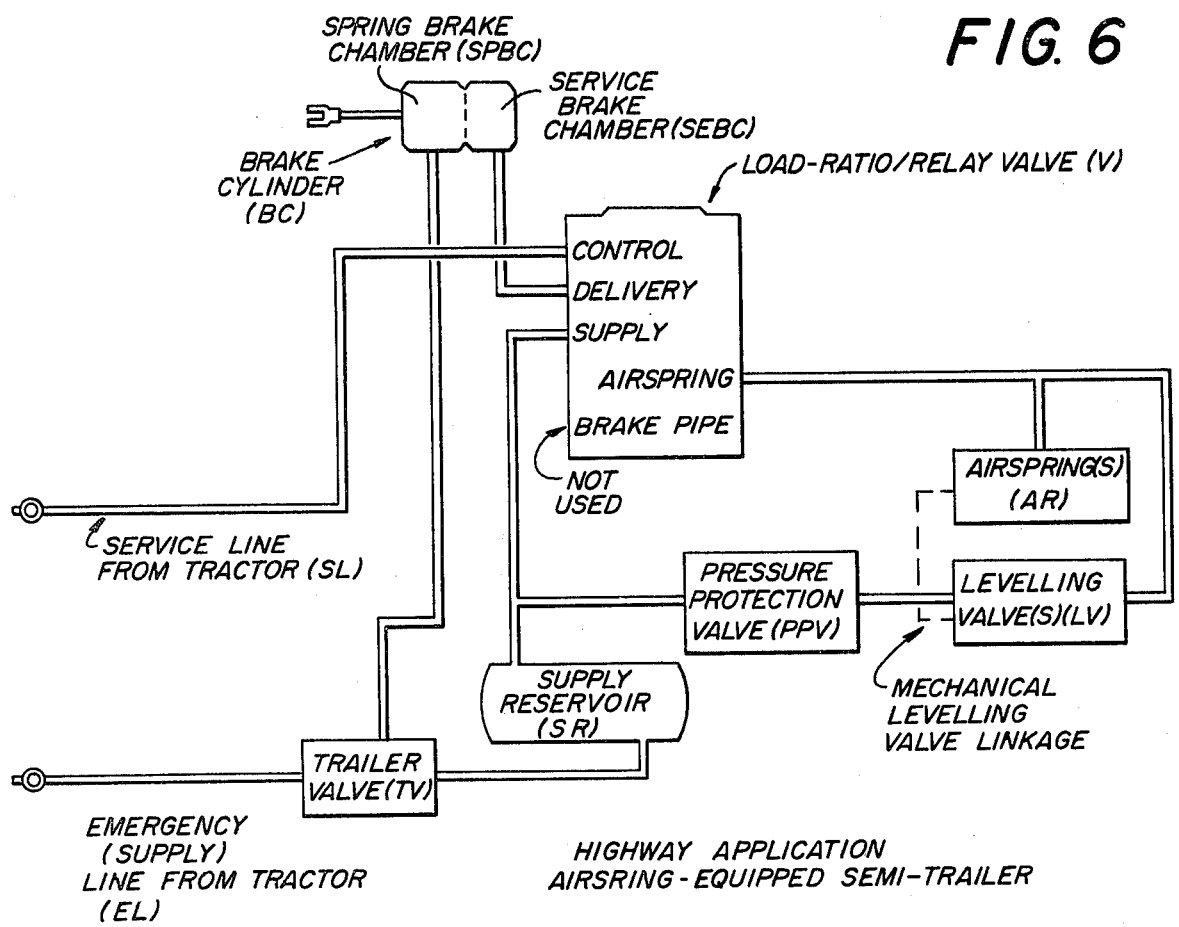
FIG. 6 is a view similar to FIG. 4 as related to highway application in which the semi-trailer is equipped with air springs.

In FIG. 6 which illustrates a highway vehicle installation wherein the semi-trailer is equipped with air springs (AS), an emergency line (EL) which is the supply line from the tractor connects to a supply reservoir (SR) via a trailer valve (TV), the supply reservoir being connected to the instant valve (V) at the supply port 70. The supply reservoir (SR) connects via a branch line (BC) containing a pressure protection valve (PPV) to levelling valves (LV) associated with the trailer wheel air springs (AS) which connect to the instant valve (V) at the air spring port 94. The brake pipe port 116 is not used in this application. Brake cylinders (BC) are provided each with a spring brake chamber (SPBC) and a service brake chamber (SEBC), the former connecting to the trailer valve (TV) and the latter to the instant valve (V) at the delivery port 64. The service line (SL) from the tractor connects up with the instant valve (V) at the control port 48.

Figure 7:
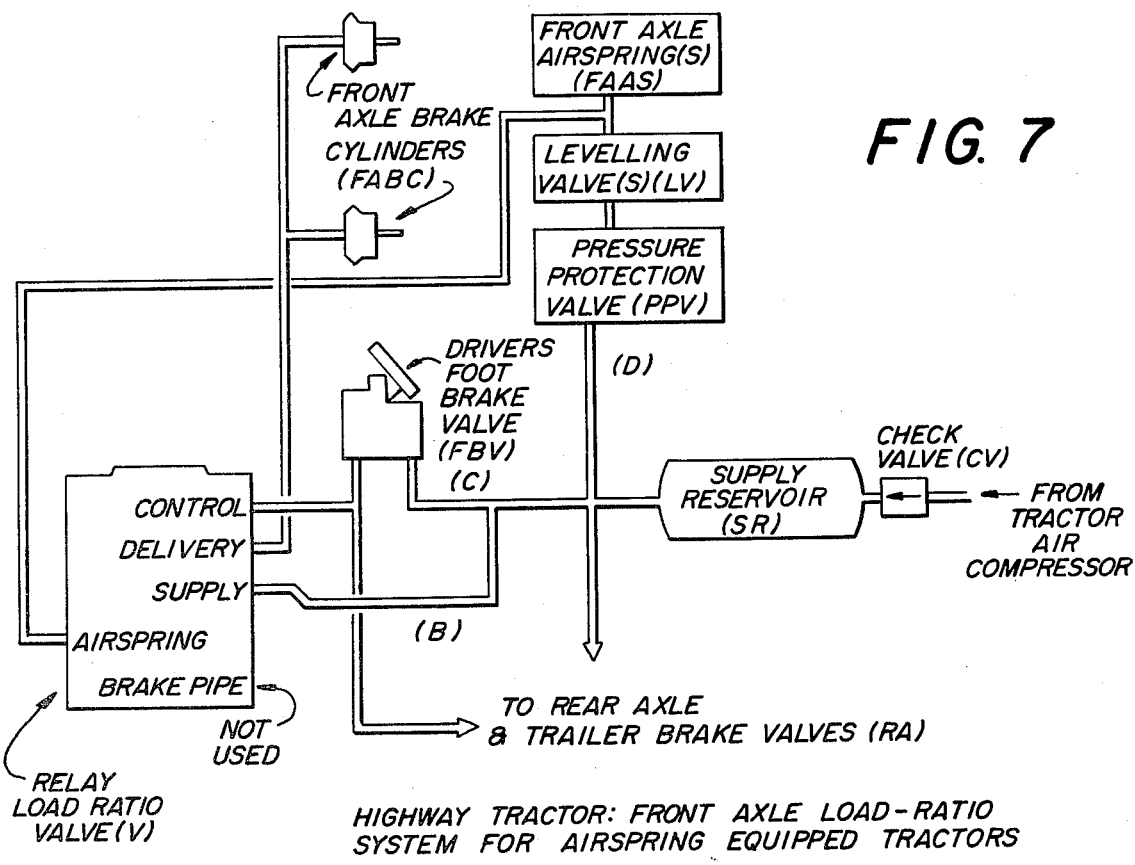
FIG. 7 is a view similar to FIG. 6 as applied to a highway tractor equipped with air springs.

In FIG. 7, a highway tractor installation is illustrated in which the tractor is equipped with front axle air springs (FAAS). Compressed air from the tractor is delivered via a check valve (CV) to a supply reservoir (SR) which connects via one branch (B) to the instant valve (V) at the supply port 70. In this application the brake pipe port 116 is not used. Another branch (C) connects the supply reservoir (SR) with the driver's foot brake valve (FBV) which is, in turn, operatively connected to the rear axle and trailer brake valves (RA). Via a third branch (D), the supply reservoir (SR) connects to the front axle air springs (FAAS) which branch contains a pressure protection valve (PPV) and levelling valves (LV). A branch (E) from line (D) connects to the instant valve (V) at the air spring port 94. The front axle brake cylinders (FABC) are connected to the instant valve (V) at the delivery port 64.

It will be understood that skilled artisans may make variations without departing from the spirit of the invention. Thus, diaphragm means may be substituted for the O-ring seals shown and described hereinbefore.

What is claimed is:

1. In a vehicle having air spring wheel suspensions and pneumatic brake cylinders, a control valve to limit maximum brake cylinder pressure in accordance with vehicle load comprising a casing having upper and lower closures, a bore therein and control, delivery, supply, and air spring ports and breather vent, a relay piston slidable in the upper end portion of the bore having a hollow valve stem extending through the upper closure to exhaust, a first chamber above said relay piston communicative with said control port, a load-limiting piston slidable in said bore beneath said relay piston, the space between said pistons constituting a second chamber communicative with said delivery port, a third chamber within said load-limiting piston including a spring-urged check valve therein, means forming communication between said third chamber and said supply port, said hollow valve stem of said relay piston including a portion extending inwardly into said second chamber adapted to engage said check valve, return spring means normally pulling said hollow stem and relay piston upwardly so that said inwardly extending portion of said hollow stem is disengaged from said check valve to allow air present in said second chamber to vent to atmosphere upon brake release; said load-limiting piston including a hollow center beneath said third chamber including an upper surface and opening through the lower end of said load-limiting piston and forming a fourth chamber communicative with said air spring port, a minimum application bias piston in said hollow center, spring means normally urging said bias piston upwardly towards said upper hollow center surface, and a fifth chamber beneath said bias piston communicative with said breather vent, whereby on service brake application in a fully loaded vehicle, air spring pressure enters said fourth chamber exerting a downward force on said bias piston against action of its spring means to move said bias piston out of contact with said load-limiting piston and supply air stops in said third chamber, and upon brake application in said fully loaded vehicle control pressure via said control port enters said first chamber above relay piston moving said relay piston and its hollow stem downward to contact and unseat said check valve allowing supply air in said third chamber to enter said second chamber and out said delivery port to said vehicle brake cylinders, and for service application in an empty vehicle; the air spring pressure in said fourth chamber is lower and the upward force on said load-limiting piston is proportionally lower so that should control pressure in said first chamber above said relay piston cause delivery pressure in said second chamber below said relay piston to exceed a predetermined pressure, pressure in said second chamber will exert a force downwardly on said load-limiting piston and move it away from said relay piston and its hollow stem closing said check valve to prevent the control valve from responding to further increase in control pressure.

2. The combination of claim 1, said casing including a brake pipe port and an emergency compensation piston beneath said bias piston, a sixth chamber in the lower closure of said casing, a second check valve in said sixth chamber, a spring normally urging said second check valve into a closed position, said emergency compensation piston including a stem extending towards said second check valve and including an axial hollow portion therethrough communicative with said fifth chamber, a seventh check valve chamber beneath said emergency compensation piston communicative with said brake pipe port, an eighth compensation chamber around said load-limiting piston above its lower end, said seventh check valve chamber communicating with said air spring port and said eighth chamber whereby for service brake application in a fully loaded vehicle, brake pipe air from said brake pipe port enters said seventh chamber beneath said emergency compensation piston causing said emergency compensation piston to move upwardly against the force of its bias spring means allowing air in said eighth compensation chamber to escape to atmosphere while air spring pressure enters said fourth chamber beneath said load-limiting piston and also into said seventh check valve chamber where it stops and supply pressure enters said third chamber where it also stops until a brake application is made.

3. The combination of claim 2 wherein said minimum application bias piston spring means is interposed between said bias piston and said emergency compensation piston.

4. The combination of claim 2 wherein said minimum application bias piston is substantially hat shaped including a crown portion adjacent said upper surface of said hollow center and a brim portion beneath the lower end of said load-limiting piston and said bias piston spring means is a coil spring in said hat-shaped piston and interposed between said crown portion and said emergency compensation piston.

5. The combination of claim 2 and stop means limiting the vertical movement of said emergency compensation piston.

6. The combination of claim 1 wherein said means forming communication between said third chamber and said supply port includes a radial passage in said load-limiting piston.

7. The combination of claim 1 wherein said minimum application bias piston is substantially hat shaped including a crown portion adjacent said upper surface of said hollow center and a brim portion beneath the lower end of said load-limiting piston.

8. The combination of claim 7 wherein said spring means normally urging said bias piston upwardly is a coil spring inside said hat-shaped piston and bearing at its upper end against said crown portion.

9. The combination of claim 1 and stop means limiting the downward movement of said relay piston and the upward movement of said load-limiting piston.

10. The combination of claim 1 and stop means limiting the downward movement of said bias piston.

11. In a vehicle having air spring wheel suspensions and pneumatic brake cylinders, a control valve to limit maximum brake cylinder pressure in accordance with vehicle load comprising a casing having upper and lower closures, a bore therein and control, delivery, supply, and air spring ports and a breather vent, a relay piston slidable in the upper end portion of the bore having a hollow valve stem extending through the upper closure to exhaust, a first chamber above said relay piston communicative with said control port, a load-limiting piston slidable in said bore beneath said relay piston, the space between said pistons constituting a second chamber communicative with said delivery port, a third chamber within said load-limiting piston including a spring-urged check valve therein, means forming communication between said third chamber and said supply port, said hollow valve stem of said relay piston including a portion extending inwardly into said second chamber adapted to engage said check valve, return spring means normally pulling said hollow stem and relay piston upwardly so that said inwardly extending portion of said hollow stem is disengaged from said check valve to allow air present in said second chamber to vent to atmosphere upon brake release, a minimum application bias piston, spring means normally urging said bias piston towards said load-limiting piston, a fourth chamber between said load-limiting and bias pistons communicative with said air spring port, and a fifth chamber beneath said bias piston communicative with said breather vent.

12. The combination of claim 11, said casing including a brake pipe port and an emergency compensation piston beneath said bias piston, a sixth chamber in the lower closure of said casing, a second check valve in said sixth chamber, a spring normally urging said second check valve into a closed position, said emergency compensation piston including a stem extending towards said second check valve and including an axial hollow portion therethrough communicative with said fifth chamber, a seventh check valve chamber beneath said emergency compensation piston communicative with said brake pipe port, an eighth compensation chamber around said load-limiting piston above its lower end, said seventh check valve chamber communicating with said air spring port and said eighth chamber.

* * * * *